(No Model.)

H. C. HAM.
FERTILIZER DISTRIBUTER ATTACHMENT FOR GRAIN DRILLS.

No. 580,644. Patented Apr. 13, 1897.

WITNESSES
George Heidman
Harvey Edwards

INVENTOR
Henry C. Ham
by Arthur Stem
atty.

United States Patent Office.

HENRY C. HAM, OF LIBERTY, INDIANA, ASSIGNOR TO THE RUDE BROTHERS MANUFACTURING COMPANY, OF SAME PLACE.

FERTILIZER-DISTRIBUTER ATTACHMENT FOR GRAIN-DRILLS.

SPECIFICATION forming part of Letters Patent No. 580,644, dated April 13, 1897.

Application filed January 16, 1897. Serial No. 619,412. (No model.)

*To all whom it may concern:*

Be it known that I, HENRY C. HAM, a citizen of the United States, residing at Liberty, in the county of Union and State of Indiana, have invented certain new and useful Improvements in Fertilizer Attachments for Grain-Drills, of which the following is a full, clear, and exact description, reference being had to the accompanying drawings, forming part of this specification.

My invention relates to fertilizer attachments for grain-drills; and it consists of certain novel means for delivering the fertilizer to the feed-openings, the construction of which will be hereinafter more particularly pointed out and claimed.

Heretofore force-feed fertilizers with a sprocket-chain carrying fingers for feeding the material to the openings have not been successful for several reasons. The fertilizer was very apt to bank against the sides of the hopper. The bottom of the hopper when made of metal soon corroded. The chain, sprockets, and fingers worked into the fertilizer, scraping the entire bottom and requiring great power to move them, the fingers passing over a series of openings in the center of the box regulated by a sliding cut-off making it impossible to secure a positive feed. The arrangement of the sprocket-chain and means and manner of operating it failed to feed the fertilizer evenly and regularly. It is to overcome these objections that my invention is desired; and it consists, essentially, as will be hereinafter more particularly described and claimed, of an endless sprocket-chain with fingers attached to the links thereof traveling in the bottom of the hopper under boxes or guards, the fingers alone coming in contact with the fertilizer to deliver the fertilizer in proper quantities to the staggered feed-tubes, the discharge-openings being left entirely open, but inclosed in housings, so as to admit only a certain quantity at a time, and the quantity of fertilizer fed being regulated only by the speed of the chain.

Figure 1:
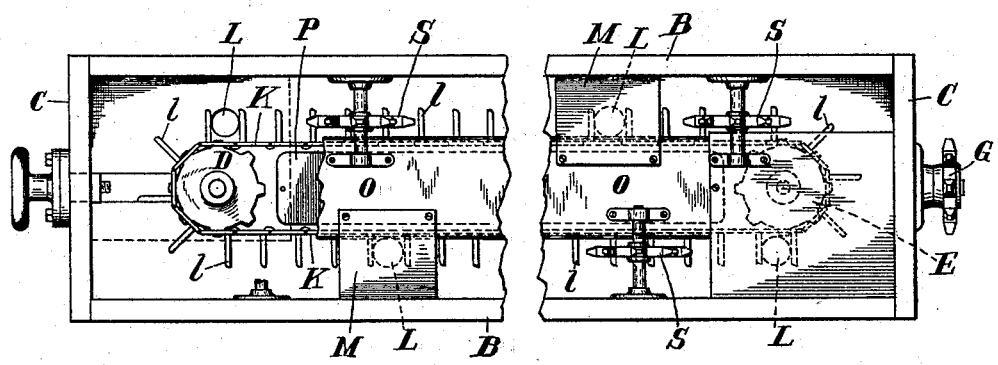
Figure 2:
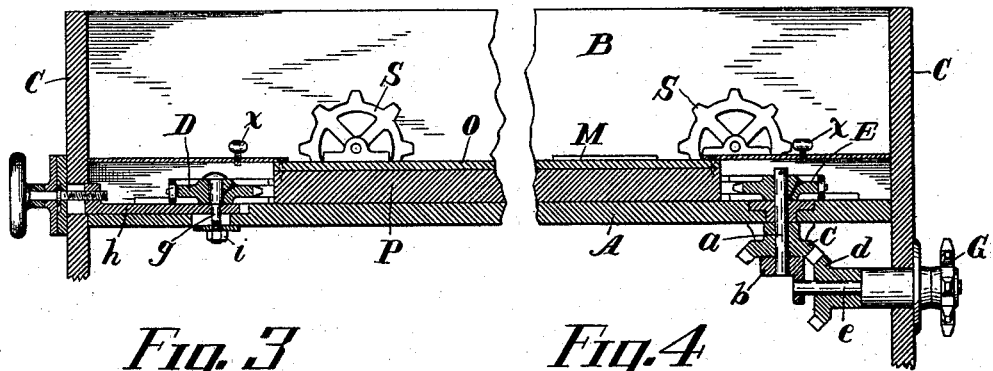
Figure 3:
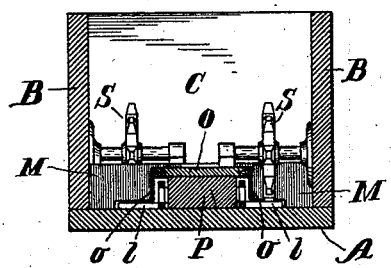
Figure 4:
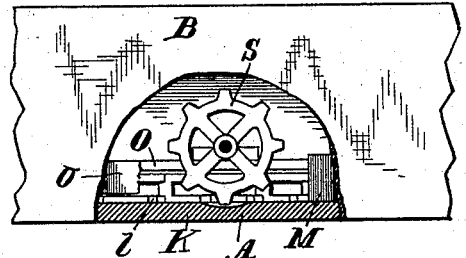

In the drawings, Figure 1 is a top plan view of my fertilizer-hopper, the housing at one end being removed and the hopper being broken away at the center. Fig. 2 is a longitudinal section of same. Fig. 3 is a cross-section. Fig. 4 is a side elevation with a part broken away, showing one of the stirrer-wheels.

The fertilizer-hopper consists of an ordinary wooden rectangular box made up of bottom A, sides B B, and ends C C. Journaled in the bottom of this box are the sprocket-wheels D E. The sprocket-wheel E is mounted on the stud or pin $a$, which extends downward through the bottom of the box into the bracket $b$. This pin carries the beveled gear-wheel $c$, which meshes with the beveled gear $d$, mounted on the pin $e$, which is journaled in the end of the bracket $b$ and in the end extension of the fertilizer-hopper C. Mounted on the outer end of this pin $e$ is the sprocket-wheel G, by means of which the feeding devices in the hopper are driven by sprocket-chain from the main axle or from the grain feed-shaft in the usual way. The other sprocket-wheel D is journaled on the pin $g$, which passes down through the casting $h$, and is secured at the bottom of the hopper by the nut $i$. When this nut $i$ is loosened, the casting $h$ can be drawn in or out to loosen or tighten the sprocket-chain, which is carried by the two sprocket-wheels, by turning the end screw on the end of the hopper. This sprocket-chain K carries on each link projecting fingers $l\ l$.

L L are the feed-openings through which the fertilizer is fed to the feed-tubes. These feed-openings are staggered across the bottom of the box alternately on one side and the other in order that there may be plenty of room for the fertilizer to come in contact with the fingers of the sprocket-chain. Over each of these feed-openings is a box or housing M M. Secured to the bottom of the box centrally between the parallel portion of the sprocket-chain is the block P to serve as a guide for the sprocket-chain, while to this block is secured the cover O, with its top edges extending out over the sprocket-chain, and provided with sides $o\ o$, extending down to the fingers on the sprocket-chain, so as to completely inclose and cover the sprocket-chain except the fingers. These fingers are the only part of the chain that comes in contact with the fertilizer, reducing the power required to operate it to a nominal amount.

The boxes or housings M M, which cover each feed-opening, have sides n n, which come down to the bottom of the hopper, leaving only an opening just large enough for the fingers on the sprocket-chain to pass through. These housings are of sufficient width or length to cover one finger on each side of the feed-opening, so that between the feed-openings L and the sides of the housings n n there will always be a finger to block the openings and prevent the leaking of the fertilizer when the chain is not in motion.

To thoroughly stir the fertilizer and insure a positive feed, the agitators S are used, which consist of armed wheels journaled to the vertical sides of the box and revolving in a vertical or upright position preferably about six inches in diameter, and so located that their teeth engage with the fingers of the sprocket-chain, whereby they are revolved. One of these agitating-wheels S is placed before each housing covering a feed-opening. The movement of the sprocket-chain revolves the agitators S, stirring the fertilizer and keeping a constant supply in position to be acted upon by the fingers on the chain, producing a positive and constant feed and preventing the tunneling under of the fertilizer.

In order to oil the sprocket-wheels D and E, I provide an opening in the covering O immediately over or a little to one side of the upper end of the stud or pin a, in which fits a thumb-screw X, Fig. 2. Oil dropped through this opening passes down along the pin a and oils it, and the bearings and the thumb-screw protect it from the fertilizer.

The operation of the feeding device will be sufficiently evident from the foregoing description. The fingers on the sprocket-chain carry between each other the proper amount of fertilizer and deliver it to the feed-openings as the sprocket-chain is propelled by means of the beveled gearing in connection with the driving wheels or axle or the grain feed-shaft. The discharge-openings remain always open. The amount of feed is regulated by varying the speed of the chain. Every portion of the sprocket-wheel except the fingers is covered, as described, so that it is extremely difficult for fertilizer to leak through into the feed-openings when the machine is not in operation, and the power required to operate the sprocket-chain is reduced to a minimum. The fingers of the sprocket-chain rotate the agitator-wheels S S and keep a constant supply of fertilizer in front of each feed-discharge opening to be fed constantly and positively, said agitators being rotated with little or no increase of power.

Having thus described my invention, what I claim, and desire to secure by Letters Patent, is—

1. In a grain-drill, the combination, with a fertilizer-hopper and constantly-open feed-openings therefor, of an endless sprocket-chain carrying fingers projecting out therefrom with boxes or housings covering the feed-openings of a length sufficient to cover one of the sprocket-fingers on each side of said openings to prevent the leaking of fertilizer when the chain is not in operation, substantially as shown and described.

2. In a grain-drill the combination, with a fertilizer-hopper and a staggered series of feed-openings therefor, of an endless sprocket-chain carrying fingers projecting therefrom, with boxes covering the feed-openings under and through which the sprocket-chain is carried substantially as shown and described.

3. In a grain-drill, the combination with a fertilizer-hopper having a staggered series of feed-openings, of an endless sprocket-chain, with sprocket-wheels therefor journaled horizontally in said hopper, said sprocket-chain carrying projecting fingers, boxes covering the feed-openings, central guide-piece for the sprocket-chain, with cover therefor, extending down over the sprocket-chain whereby all of the sprocket-chain is protected from the fertilizer except the projecting fingers, substantially as shown and described.

4. In a grain-drill, the combination with a fertilizer-hopper and a staggered series of feed-openings therefor, of an endless sprocket-chain, with sprocket-wheels therefor journaled horizontally in said hopper, said sprocket-chain carrying projecting fingers, boxes covering the feed-openings and housings covering the sprocket-wheels, central guide-piece for the sprocket-chain with cover therefor extending down over the sprocket-chain and beveled gearing underneath said hopper for driving said sprocket-chain, substantially as shown and described.

5. In a grain-drill the combination with a fertilizer-hopper, of an endless sprocket-chain moving along the bottom of the hopper said chain having horizontal fingers attached to the lower part of each link to extend out from under the housings covering the chain and engage and move the fertilizer to the feed-openings, substantially as shown and described.

6. In a grain-drill the combination with a fertilizer-hopper, sprocket-wheels journaled horizontally on the bottom of the hopper and carrying an endless sprocket-chain with horizontally-extending fingers, the sprocket wheels and chain being protected from the fertilizer by coverings or housings, substantially as and for the purpose described.

7. In a grain-drill the combination with a fertilizer-hopper, sprocket-wheels journaled horizontally on the bottom of the hopper and carrying an endless sprocket-chain with horizontally-extending fingers, the sprocket wheels and chain being protected from the fertilizer by coverings or housings, said housings over the sprocket-wheels being provided with oil-openings and thumb-screws over the upper end of their axles, substantially as and for the purpose described.

8. In a grain-drill the combination with the fertilizer-hopper and feed-openings therefor, an endless sprocket-chain journaled horizontally in said hopper and carrying side-projecting fingers, of vertical agitators rotated by said fingers on the sprocket-chain, substantially as and for the purpose described.

9. In a fertilizer attachment for a grain-drill, agitators revoluble in a vertical plane within the hopper, operated by the side-extending fingers on the sprocket-chain journaled horizontally in the hopper, to agitate the fertilizer to be fed to the feed-openings by said fingers, substantially as and for the purpose described.

HENRY C. HAM.

Witnesses:
HERBERT DARR,
J. H. DAVIS.